United States Patent
Jacob

(10) Patent No.: US 9,958,352 B2
(45) Date of Patent: May 1, 2018

(54) PRESSURE MEASURING CELL, INCLUDING A MEASURING MEMBRANE ARRANGED AT A MEASURING CELL BODY VIA A JOINING STRUCTURE

(71) Applicant: VEGA GRIESHABER KG, Wolfach (DE)

(72) Inventor: Jörn Jacob, Wolfach (DE)

(73) Assignee: Vega Grieshaber KG, Wolfach (DE)

( * ) Notice: Subject to any disclaimer, the term of this patent is extended or adjusted under 35 U.S.C. 154(b) by 0 days. days.

(21) Appl. No.: 15/103,666

(22) PCT Filed: Jun. 16, 2014

(86) PCT No.: PCT/EP2014/062597
§ 371 (c)(1),
(2) Date: Jun. 10, 2016

(87) PCT Pub. No.: WO2015/120919
PCT Pub. Date: Aug. 20, 2015

(65) Prior Publication Data
US 2016/0341621 A1  Nov. 24, 2016

(30) Foreign Application Priority Data
Feb. 12, 2014   (DE) ........................ 10 2014 101 700

(51) Int. Cl.
*G01L 19/06* (2006.01)
*G01L 9/00* (2006.01)

(52) U.S. Cl.
CPC ........ *G01L 19/0618* (2013.01); *G01L 9/0072* (2013.01); *G01L 19/06* (2013.01)

(58) Field of Classification Search
CPC . G01L 19/0618; G01L 9/0072; G01L 9/0075; G01L 19/14; G01L 19/0061; G01L 9/0086; G01D 5/2417; H04R 19/04
(Continued)

(56) References Cited

U.S. PATENT DOCUMENTS

| 4,287,553 A | 9/1981 | Braunlich |
| 2004/0250627 A1* | 12/2004 | Jacob .................... G01L 9/0075 73/723 |
| 2007/0095147 A1* | 5/2007 | Kikuiri ................. G01L 9/0073 73/724 |

FOREIGN PATENT DOCUMENTS

| DE | 32 38 430 A1 | 10/1982 |
| DE | 88 15 425 U1 | 12/1988 |

(Continued)

OTHER PUBLICATIONS

Berlinger Andrea [DE]; Drewes Ulfert [DE]; Schmidt Elke [DE]; Selders Peter [DE] + (Berlinger, Andrea, ; Drewes, Ulfert, ; Schmidt, Elke, ; Selders, Peter), Capacitive Ceramic Pressure Measurement Cell , WO2011061006 (A1)—May 26, 2011.*

(Continued)

*Primary Examiner* — Harshad R Patel
*Assistant Examiner* — Brandi Hopkins
(74) *Attorney, Agent, or Firm* — William Gray Mitchell

(57) ABSTRACT

The invention is a pressure-measuring cell comprising a measuring cell body, a measuring membrane arranged on the front face of the measuring cell body by means of a joining structure, wherein the measuring cell body and the measuring membrane each have at least one measuring electrode, which electrodes form a measuring capacitor, and at least one support element provided on the measuring membrane and/or the measuring cell body within the joining structure.

14 Claims, 1 Drawing Sheet

(58) Field of Classification Search
USPC .......................................... 73/723–724, 718
See application file for complete search history.

(56) References Cited

FOREIGN PATENT DOCUMENTS

| | | | |
|---|---|---|---|
| DE | 39 40 709 A1 | 6/1991 | |
| DE | 41 24 662 A1 | 7/1991 | |
| DE | 41 11 119 A1 | 10/1992 | |
| DE | 101 32 269 B4 | 1/2003 | |
| DE | 102009046844 A1 * | 5/2011 | ........... G01L 9/0044 |
| EP | 0 373 536 A2 | 6/1990 | |
| EP | 0 524 550 A1 | 1/1993 | |
| EP | 1780 525 A1 | 5/2007 | |
| JP | S56 162 026 A | 5/1980 | |
| WO | WO 99/01731 A1 | 1/1999 | |

OTHER PUBLICATIONS

GPTO search report for related application 10 2014 101 700.5 dated Apr. 3, 2014.
International Search Report for related international application PCT/EP2014/062597, dated Nov. 24, 2014.

* cited by examiner

PRESSURE MEASURING CELL, INCLUDING A MEASURING MEMBRANE ARRANGED AT A MEASURING CELL BODY VIA A JOINING STRUCTURE

STATEMENT REGARDING FEDERALLY SPONSORED RESEARCH OR DEVELOPMENT

No federal government funds were used in researching or developing this invention.

CROSS REFERENCE TO RELATED APPLICATIONS

This patent application claims priority to International Patent Application PCT/EP2014/062597, filed on Jun. 16, 2014, and thereby to German Patent Application 10 2014 101 700.5, filed on Feb. 12, 2014.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to a pressure measurement cell.

Background of the Invention

Various pressure measuring cells are known from prior art, which essentially comprise a measuring cell body as well as a measuring membrane arranged at said measuring cell body via a joining structure. The pressure measuring cells of prior art are frequently embodied as capacitive pressure measuring cells, in which both the measuring cell body as well as the measuring membrane each carry metallization structures, which are called measuring electrodes and form a measuring capacitor. By the impact of pressure upon the measuring membrane here the distance changes between these measuring electrodes so that pressure determination is possible based on the capacity measured.

In these pressure measuring cells it frequently occurs in practice that the measuring cell is stressed beyond the normal measuring range. A so-called overload limit states to what extent such a measuring cell may be overloaded without causing it to lose its technical measuring capabilities and/or without them changing. Ceramic pressure measuring cells, in which the measuring cell body and the measuring membrane are made from technical ceramics, for example $AL_2O_3$, are characterized in high overload resistance, which is caused by the mechanic design as well as the high strength values and the very good elastic behavior of ceramics. In case of frequent overloads, however, even these measuring cells may be damaged and for example show an undesired measurement shift.

Approaches are known from prior art in which it is attempted, for example by a concave embodiment of the surface of the measuring cell body, to prevent any excess stress of the measuring membrane such that here damages are prevented. By such a concave embodiment of the measuring cell body the determination of the measuring capacity is considerably aggravated, which is experienced as disadvantageous.

In these approaches it is also considered disadvantageous that these technologies are cumbersome in their realization and thus expensive in their production.

The objective of the present invention is to provide a pressure measuring cell which simultaneously shows easy technical realization and increased overload capacity, and technical disadvantages of the measuring process are avoided.

This objective is attained in a pressure measuring cell as described herein.

BRIEF SUMMARY OF THE INVENTION

In a preferred embodiment, a pressure measuring cell (1) with a measuring cell body (3), a measuring membrane (7) arranged at the face of the measuring cell body (3) via a joining structure (5), with the measuring cell body (3) and the measuring membrane (7) respectively comprising at least one measuring electrode (9), which form a measuring capacitor ($C_{mess}$), characterized in that at least one support element (11) is provided at the measuring membrane (7) and/or the measuring cell body (3) inside the joining structure (5).

In another preferred embodiment, a pressure measuring cell (1) according to one of the previous claims, characterized in that the joining structure (5) is generated via glass solder.

In another preferred embodiment, a pressure measuring cell (1) according to one of the previous claims, characterized in that at least one support element (11) is produced via glass solder.

In another preferred embodiment, a pressure measuring cell (1) according to one of the previous claims, characterized in that one height (h) of at least one support element (11) and one radial arrangement of at least one support element (11) are adjusted to each other such that the support element (11) and the measuring membrane (7) or the support element (11) and the measuring cell body (3) are made to contact when a maximum measuring pressure $P_{max}$ is exceeded by at least 50% and at least one support element (11) supports the measuring membrane (7) at the measuring cell body (3).

In another preferred embodiment, a pressure measuring cell (1) according to one of the previous claims, characterized in that at least one support element (11) shows a height from 25% to 60% in reference to a distance from the measuring cell body (3) to the measuring membrane (7) and is arranged offset inwardly from the joining structure (5) by 10% to 50% of a radius (r) of the measuring cell (1).

In another preferred embodiment, a pressure measuring cell (1) according to one of the previous claims, characterized in that at least one support element (11) shows in the radial direction an extension (e) from 100 µm to 1000 µm, preferably amounting to approximately 500 µm.

In another preferred embodiment, a pressure measuring cell (1) according to one of the previous claims, characterized in that at least one support element (11) shows a height (h) from 5 µm to 15 µm, preferably amounting to approximately 8 µm.

In another preferred embodiment, a pressure measuring cell (1) according to one of the previous claims, characterized in that at least one support element (11) is embodied as at least one support ring.

In another preferred embodiment, a pressure measuring cell (1) according to one of the previous claims, characterized in that the support ring surrounds the measuring electrode (9).

In another preferred embodiment, a pressure measuring cell (1) according to one of the previous claims, characterized in that the measuring cell body (3) and/or the measuring membrane (7) show a preferably ring-shaped reference electrode (13), surrounding the preferably circularly embodied measuring electrode (9), forming a reference capacitor ($C_{ref}$), with the support ring being arranged between the reference electrode (13) and the measuring electrode (9).

In another preferred embodiment, a pressure measuring cell (1) according to one of the previous claims, characterized in that at least one support element (11) shows an essentially trapezoidal or rectangular cross-section in the radial direction.

In another preferred embodiment, a method for the production of a pressure measuring cell (1) comprising at least the following steps:

Providing a measuring cell body (3),

Applying a metallization layer on the measuring cell body (3) and perhaps structuring it in order to form a measuring electrode (9), Applying a first circumferential glass solder layer (5.1) on the measuring cell body (3), Providing a measuring membrane (7), Applying a metallization layer on the measuring membrane (7) and perhaps structuring thereof to form a measuring electrode (9), Applying a second circumferential glass solder layer (5.1) on the measuring membrane (7), and Arranging the measuring membrane (7) and the measuring cell body (3) on top of each other and melting the first glass solder layer and the second glass solder layer to form a jointing structure (5), characterized in that simultaneous to the first glass solder layer and/or the second glass solder layer another glass solder layer is applied to form a support element.

In another preferred embodiment, the method described herein, characterized in that the first glass solder layer and/or the second glass solder layer and/or the additional glass solder layer are applied by serigraphy.

DETAILED DESCRIPTION OF THE INVENTION

Figure 1:
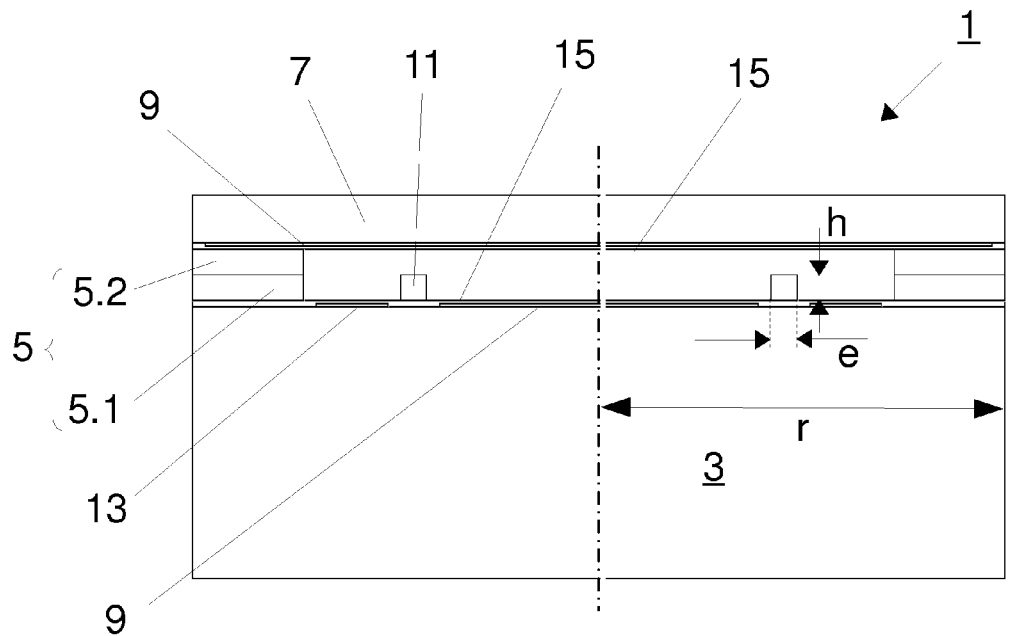
FIG. 1 is a line drawing evidencing a cross-section through a first exemplary embodiment of a pressure measuring cell.

A pressure measuring cell according to the invention comprises a measuring cell body and at the front face a measuring membrane, arranged at the measuring cell body via a jointing structure, with the measuring cell body and the measuring cell membrane each comprising a measuring electrode, which forms a measuring capacitor, and at least one support element being provided at the measuring membrane and/or at the measuring cell body inside the jointing structure.

By providing such a support element it is achieved that in case of overload occurring, i.e. when the pressure measuring cell is stressed beyond a permitted value, the measuring membrane is provided with mechanic support at a considerably earlier point of time than otherwise possible without the support element, allowing to considerably reduce the forces acting upon the measuring membrane and the stress resulting therefrom.

The present invention is here based on the acknowledgement that a drift in measurements caused by overload in typical ceramic pressure measuring cells occurs by excess stress in the measuring membrane at an inner diameter of the joining structure, by which the measuring membrane is fastened at the measuring cell body, because in this area a particularly low bending radius is given due to the occurrence of an edge. Based on this excess stress, microfractures can develop in the measuring membrane in case of frequent overload at the surface of the membrane, which enlarge with the frequency of the stress. Such fractures alter the elastic features of the measuring membrane such that this also leads to a changed measuring behavior in the permitted measuring range. In case of overload, a support element 11 according to the invention reduces both a pressure of the circumferential joining structure 5 in the proximity of its inner edge as well as the tensions developing in the measuring membrane 7, particularly in an area at the inner edge of the joining structure 5, and particularly in the proximity of the surface of the measuring membrane 7 facing the process.

A particularly beneficial arrangement of the measuring membrane and the measuring cell body can be achieved when the joining structure is produced by glass solder, hard solder, or layers of hard solder of other mechanically sufficiently stable layers, e.g., evaporated or sputtered layers, such as silicon oxide, silicon carbide, or the like.

A bonding via glass solder or hard solder has proven beneficial, since with glass solder a tight connection can be generated both to the measuring cell body as well as the measuring membrane, with the process temperature required for the generation of such a joining structure being in a range, which damages neither the measuring membrane nor the measuring electrodes.

In a preferred embodiment at least one support element can also be produced from glass solder.

If at least one support element is also made from glass solder, it shows on the one hand the positive features of the joining structure and can on the other hand be produced in one processing step, for example with the preparation for the joining structure.

A particularly beneficial arrangement is given when a height of at least one support element and a radial arrangement of at least one support element are adjusted to each other such that the support element and the measuring membrane or the support element and the measuring cell body are made to contact when a maximum measuring pressure is exceeded by at least 50%, so that at least one support element supports the measuring membrane at the measuring cell body.

In the present embodiment it is decisive that the measuring membrane of a pressure measuring cell bends depending on pressure and thus the distances reduces between the measuring membrane and the measuring cell body. In order to achieve reliable support and thus release of the measuring membrane starting at an overload of 50%, it is therefore necessary to coordinate the height of the support element used as well as its arrangement such that depending on the mechanic features of the measuring membrane here support is given starting at a certain excess pressure.

Ideally, support occurs here beginning with excess pressure 50% above the maximally permitted measuring pressure.

The support element may here show a height of for example 25 to 50% in reference to a distance between the measuring cell body and the measuring membrane and preferably be arranged inwardly offset in reference to the joining structure, preferably from 10 to 50% of a radius of the measuring cell. In a preferred embodiment at least one support element shows an extension from 100 to 1000 µm in the radial direction, with here an extension amounting to 500 µm proving particularly advantageous.

Further, at least one support element may show a height from 5 to 15 µm, with a height of approximately 8 µm being particularly preferred.

A particularly effective support can be achieved when at least one support element is embodied as a support ring, which preferably surrounds the measuring electronic.

Particularly in case of cylindrically embodied measuring cells with circular measuring membranes, with a support ring being embodied in such a fashion that here an even support of the measuring membrane can be achieved in case of overload, with simultaneously a particularly beneficial production being possible.

The measuring cell body and/or the measuring membrane can additionally be embodied preferably in an annular fashion and comprise the reference electrode surrounding the circularly embodied measuring electrode, which forms a reference capacitor with a corresponding reference electrode at the measuring membrane or the measuring cell body, with the support ring then preferably being arranged between the reference electrode and the measuring electrode.

If for example the measuring cell body shows an annular reference electrode surrounding a circularly embodied measuring electrode, the support ring is preferably arranged between them. This way it is avoided that the support ring and/or at least one support element change the electric features of the measuring cell.

In particular, the support element may show in the radial direction an essentially trapezoidal or rectangular cross-section, allowing particularly in case of an embodiment with an inwardly reducing contour an improved contacting behavior of the measuring membrane to the support element.

The method according to the invention for producing a pressure measuring cell shows at least the following steps:
  Providing a measuring cell body (3),
  Applying a metallization structure on the measuring cell body (3) and perhaps structuring it in order to form a measuring electrode (9),
  Applying a first circumferential glass solder layer (5.1) on the measuring cell body (3),
  Providing a measuring membrane (7),
  Applying a metallization structure on the measuring membrane (7) and perhaps structuring it to form a measuring electrode (9),
  Applying a second circumferential glass solder layer (5.1) on the measuring membrane (7), and
  Arranging the measuring membrane (7) and the measuring cell body (3) on top of each other and welding the first glass solder layer and the second glass solder layer to form a joining structure (5), By the method according to the invention it is particularly achieved that the inventive support element can be integrated without additional processing steps in a production process for the pressure measuring cells.

In a preferred embodiment both the circumferential glass solder layers for the production of the joining structure as well as the glass solder layer for the production of at least one support element are applied via a serigraphy.

DETAILED DESCRIPTION OF THE FIGURES

The illustration in FIG. 1 is a cross-section along the longitudinal axis of an otherwise rotationally symmetrically designed pressure measuring cell 1. The pressure measuring cell 1 essentially comprises a measuring cell body 3, at which at the face, i.e. in the present illustration at the top, a measuring membrane 7 is arranged via a circumferential joining structure 5. In the present exemplary embodiment the joining structure 5 is formed from a first circumferential glass solder layer 5.1, which is arranged at the measuring cell body 3, and a second circumferential glass solder layer 5.2, which is arranged at the measuring membrane 7.

During the production of the pressure measuring cell 1 shown, the two glass solder layers 5.1, 5.2 are applied separately on the measuring cell body 3 and/or the measuring membrane 7 and welded after the measuring membrane 7 was arranged on the measuring cell body 3. A measuring electrode 9 is arranged at the measuring cell body 3 of the present pressure measuring cell 1 at a surface facing the measuring membrane 7, which measuring electrode is surrounded at a distance with a reference electrode 13. In the present exemplary embodiment the measuring electrode 9 is embodied circularly and the reference electrode 13 surrounding it is ring-shaped.

A measuring electrode 9 is also arranged at the measuring membrane 7 at a surface allocated to the measuring cell body 3, which in the present case is embodied in a holohedral fashion.

By the measuring electrode 9 arranged at the measuring membrane 7 as well as the electrodes 9, 13 arranged at the measuring cell body 3 here a measuring capacitor $C_{mess}$ and a reference capacitor $C_{ref}$ are formed, by which pressure determination is possible. The electrodes 9, 13 arranged at the measuring cell body 3 and the measuring membrane 7 are coated in the present exemplary embodiment with a hydrophobic protective layer 13, for example, which changes precipitations of condensate at the electrodes and thus prevents corrosion over time. The hydrophobic protective layer is embodied a glazing 15 in the present exemplary embodiment.

In the exemplary embodiment shown in FIG. 1, additionally a support element 11 is provided, embodied as a support ring and arranged between the measuring electrode 9, arranged at the measuring cell body 3, and the reference electrode 13, arranged at the measuring cell body 3.

As an alternative to an annular embodiment of the support element 11, here the arrangement of a plurality of individual support elements or the provision of several support rings is possible as well.

The support ring 11 illustrated here shows in the radial direction an extension e of approximately 500 µm and a height h of also 8 µm. At a distance d of the surfaces of the measuring cell body 3 and the measuring membrane 7 facing each other, ranging from approximately 16 to 20 µm, and an arrangement of the support ring at a distance of approximately 3 mm from the circumferentially arranged joining structure 5, a support of the measuring membrane 7 is achieved when the maximally permitted pressure is exceeded by 50%.

This way, in particular excess stress can be achieved (sic) at the surface of the measuring membrane 7 facing the process, particularly in the proximity of a circumferential inner edge of the joining structure 5, which leads to considerably improved extended stability of the achievable measuring results, in spite of possible overload.

Figure 2:
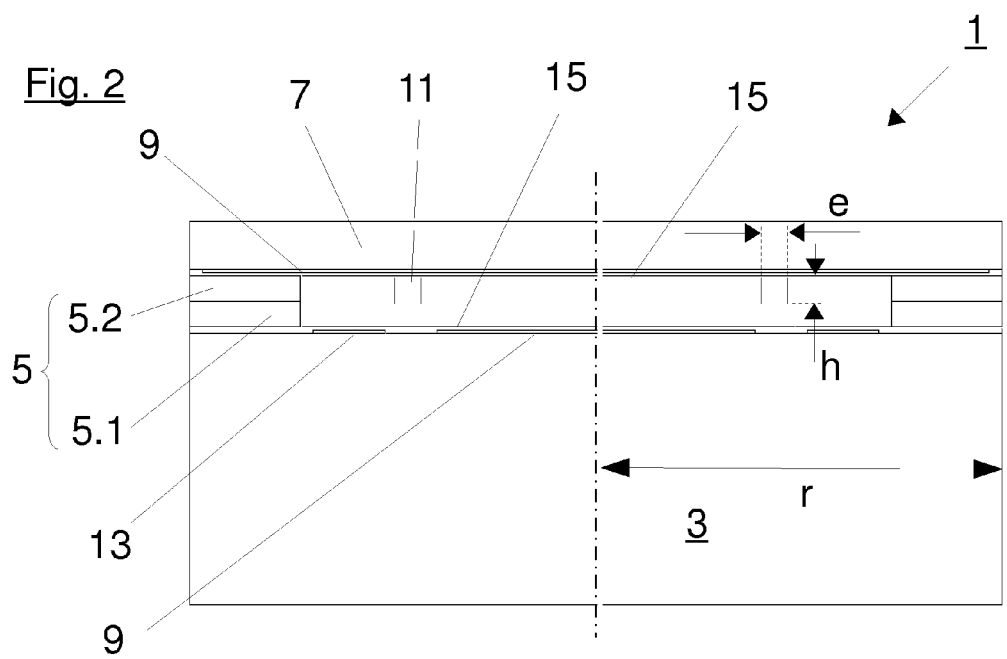
FIG. 2 is a line drawing evidencing a cross-section through a second exemplary embodiment of a pressure measuring cell.

FIG. 2 shows another exemplary embodiment of a pressure measuring cell 1, with here, unlike in the exemplary embodiment of FIG. 1, the support element 11, which in the second exemplary embodiment is also formed as a support ring, rests at the surface of the measuring membrane 7 facing the measuring cell body 3. Such an embodiment can be selected as an alternative to the embodiment shown in FIG. 1, with in the exemplary embodiment shown in FIG. 2 it being necessary to observe that the elastic features of the measuring membrane 7 are not altered by the support element 11.

Here, it shall be pointed out that other embodiments are possible as well, particularly embodiments in which potentially one or more respective support elements 11 are provided at the measuring cell body as well as at the measuring membrane, without here leaving the fundamental concept of the present invention.

In the production of the present pressure measuring cells 1 shown the support ring 11 may for example be made from the same glass solder as the circumferential glass solder layers 5.1, 5.2, and thus simultaneously applied with them on the respective surface of the measuring cell body 3 and/or the measuring membrane 7. In a preferred method both the circumferential glass solder layers 5.1, 5.2 as well as the support element 11 are applied by serigraphy and subsequently welded in a tempering step.

LIST OF REFERENCE NUMBERS 1 pressure measuring cell
3 measuring cell carrier
5 joining structure
5.1 first circumferential glass solder layer
5.2 second circumferential glass solder layer
7 measuring membrane
9 measuring electrodes
11 support element
13 reference electrode
15 enameling/protective layer
$C_{mess}$ measuring capacitor
$C_{ref}$ reference capacitor
$P_{max}$ maximum measuring pressure
h height
d distance
r radius
e extension The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. A pressure measuring cell with a measuring cell body, a measuring membrane arranged at a front face of the measuring cell body via a joining structure, with the measuring cell body and the measuring membrane respectively comprising at least one measuring electrode, which form a measuring capacitor, wherein at least one support element is provided at the measuring membrane and/or the measuring cell body inside the joining structure, wherein the joining structure is circumferential, and wherein the support element is arranged in a space defined by the measuring membrane, the measuring cell body, and the joining structure, wherein one height of at least one support element and one radial arrangement of at least one support element are adjusted to each other such that the support element and the measuring membrane or the support element and the measuring cell body are made to contact when a maximum measuring pressure $P_{max}$ is exceeded by at least 50% and at least one support element supports the measuring membrane at the measuring cell body.

2. The pressure measuring cell according to claim 1, wherein the joining structure is generated via glass solder.

3. The pressure measuring cell according to claim 1, wherein at least one support element is produced via glass solder.

4. The pressure measuring cell according to claim 1, wherein at least one support element shows a height from 25% to 60% in reference to a distance from the measuring cell body to the measuring membrane and is arranged offset inwardly from the joining structure by 10% to 50% of a radius of the measuring cell.

5. The pressure measuring cell according to claim 1, wherein at least one support element shows in the radial direction an extension from 100 μm to 1000 μm, preferably amounting to approximately 500 μm.

6. The pressure measuring cell according to claim 1, wherein at least one support element shows a height from 5 μm to 15 μm, preferably amounting to approximately 8 μm.

7. The pressure measuring cell according to claim 1, wherein at least one support element is embodied as at least one support ring.

8. The pressure measuring cell according to claim 1, wherein the support ring surrounds the measuring electrode.

9. The pressure measuring cell according to claim 1, wherein the measuring cell body and/or the measuring membrane show a reference electrode surrounding the measuring electrode, forming a reference capacitor, with the support ring being arranged between the reference electrode and the measuring electrode.

10. The pressure measuring cell according to claim 9, wherein the reference electrode is ring-shaped and surrounds the measuring electrode, which is circularly embodied.

11. The pressure measuring cell according to claim 1, wherein at least one support element shows an essentially trapezoidal or rectangular cross-section in the radial direction.

12. A method for the production of a pressure measuring cell comprising at least the following steps:
providing a measuring cell body,
applying a metallization layer on the measuring cell body and,
applying a first circumferential glass solder layer on the measuring cell body,
providing a measuring membrane,
applying a metallization layer on the measuring membrane and,
applying a second circumferential glass solder layer on the measuring membrane, and
arranging the measuring membrane and the measuring cell body on top of each other and melting the first glass solder layer and the second glass solder layer to form a jointing structure,
wherein, together with the first glass solder layer and/or the second glass solder layer, another glass solder layer is applied to form a support element.

13. The method according to claim 12, wherein the first glass solder layer, the second glass solder layer and the additional glass solder layer are applied by serigraphy.

14. The method of claim 12, wherein
the measuring cell body is structured to form a measuring electrode, and
the measuring membrane is structured to form a measuring electrode.

\* \* \* \* \*